United States Patent [19]

Remond et al.

[11] Patent Number: 4,934,426

[45] Date of Patent: Jun. 19, 1990

[54] PROCESS OF BONDING TWO RUBBER BODIES BY VULCANIZATION OF A CONNECTING LAYER, PRODUCTS SUITABLE FOR USE IN SUCH PROCESS AND PRODUCTS THUS OBTAINED

[75] Inventors: Michel Remond, Saint-Genes-Champanelle; Bernard Rossignol, Chateaugay, both of France

[73] Assignee: Companie Generale des Etablissements Michelin, Clermont-Ferrand, France

[21] Appl. No.: 1,701

[22] Filed: Jan. 9, 1987

Related U.S. Application Data

[63] Continuation of Ser. No. 715,008, Mar. 22, 1985, abandoned.

[30] Foreign Application Priority Data

Apr. 9, 1984 [FR] France ................................ 8405709
Nov. 15, 1984 [FR] France ................................ 8417578

[51] Int. Cl.⁵ ............................................. B60C 5/22
[52] U.S. Cl. .............................. 152/339.1; 152/209 R; 156/87; 156/95; 156/96; 156/97; 156/127; 156/286; 156/909; 264/36
[58] Field of Search ...................... 156/87, 95, 127, 96, 156/286, 97, 909; 152/209 R, 339.1; 264/36

[56] References Cited

U.S. PATENT DOCUMENTS

| | | | |
|---|---|---|---|
| 2,960,138 | 11/1960 | Chiodo | 152/209 R |
| 3,325,326 | 6/1976 | Schelkmann | 156/96 |
| 3,945,871 | 3/1976 | Schelkmann | 156/96 |
| 4,424,088 | 1/1984 | Durif | 156/87 |

FOREIGN PATENT DOCUMENTS

| | | | |
|---|---|---|---|
| 2647514 | 4/1978 | Fed. Rep. of Germany | 156/87 |
| 0015921 | 1/1982 | Japan | 156/87 |
| 0092699 | 11/1959 | Netherlands | 156/96 |
| 0746375 | 3/1956 | United Kingdom | 156/96 |

*Primary Examiner*—John J. Gallagher
*Attorney, Agent, or Firm*—Brumbaugh, Graves, Donohue & Raymond

[57] ABSTRACT

A process of bonding two bodies of rubber by vulcanization of a connecting layer of vulcanizable rubber provides essentially a new manner of organizing the drainage of gaseous inclusions imprisoned between the bodies and/or resulting from the subsequent vulcanization reaction and of collecting these gases; the gaseous inclusions travel towards at least one conduit which passes through at least one of the two bodies, or else towards dead-end holes provided in one of the faces intended to be bonded.

16 Claims, 4 Drawing Sheets

PROCESS OF BONDING TWO RUBBER BODIES BY VULCANIZATION OF A CONNECTING LAYER, PRODUCTS SUITABLE FOR USE IN SUCH PROCESS AND PRODUCTS THUS OBTAINED

This application is a continuation of application Ser. No. 715,008, filed on Mar. 22, 1985, now abandoned.

SPECIFICATION

The present invention relates to a process for bonding two bodies of vulcanized or vulcanizable rubber. It relates, in particular, to the bonding of a tire tread to a tire carcass of a pneumatic tire or of an elastic solid tire at the time of manufacture or else upon a subsequent restoration which may be a local repair or a recapping. More particularly, it relates to "outside the mold" restoration processes, that is to say those employing a non-vulcanized, partially vulcanized or vulcanized pre-molded tire tread (complete or in parts). The invention also relates to a rubber body suitable for use in the bonding process, in particular a tire tread or a part of a tire tread.

A first known bonding process applied to the restoration of tire treads is described, for instance, in U.S. Pat. No. 2,966,936. It consists in introducing into an airtight flexible sheath an assembly consisting of the tire carcass to be restored, the prevulcanized tread arranged on and around the carcass, and a connecting layer of vulcanizable rubber arranged between the carcass and the tread. The purpose in view is to obtain very strong adherence between the tread and the carcass on which it is arranged. In order to assure as strong an attachment as possible, it is important that the gases or vapors which are inevitably present between the two faces to be assembled or which result from the vulcanization reaction be removed practically completely, so that no gaseous inclusion jeopardizes the strength of the assembly. Furthermore, during the vulcanization it is necessary to avoid the infiltration of the heating fluid at the level of the connecting layer of rubber and to permit the evacuation of the remaining gases or the gases resulting from the vulcanization reaction.

More precisely, it is necessary to evacuate the included gases towards the ends of the connecting layer of rubber which are located at each shoulder. After evacuation of the included gases, it is necessary to avoid allowing the heating fluid to penetrate into the connecting layer of rubber at these same ends. This is the purpose of the airtight flexible sheath into which the assembly to be vulcanized is introduced. A part of the imprisoned air is expelled by the action of a roller wheel. The airtight flexible sheath is connected to a source of vacuum in order to draw the included gases off as completely as possible. The assembly to be restored, introduced within the airtight flexible sheath, is then placed within a heating enclosure in order to effect the vulcanizing of the connecting layer of rubber. If necessary, the airtight flexible sheath is kept connected to a source of vacuum or to a region which is at a pressure below the pressure of the vulcanization enclosure. The airtight flexible sheath prevents any infiltration of the heating fluid. This process has numerous drawbacks which relate to the use of the airtight flexible sheath, namely numerous cumbersome manipulations, short life of the sheath, necessity of having additional accessories when using a partial sheath which does not completely surround the unit to be vulcanized.

A second known bonding process applied to the restoration of tires is described in U.S. Pat. No. 3,689,337. This process does not use an airtight flexible sheath or at least does not maintain it in the vulcanization enclosure. It proposes assuring the required tightness by producing, chemically or mechanically, a bonding on the ends of the connecting layer of rubber. According to this process, it is therefore necessary, first of all, to expel the air contained between the tread and the carcass. This can be done by the action of a roller wheel and/or by using an airtight flexible sheath which covers the tread and a part of the sidewalls. It is necessary to assure tightness between the sheath and the sidewalls. The sheath is connected to a source of vacuum which evacuates the included air by suctioning. Whatever the technique employed for the removal of the air, this second process contemplates making the ends tight (to air and to the heating fluid) by closing the ends by covering them with a suitable material or by local vulcanization. Thus, the carcass, covered with the connecting layer of rubber and provided with a tread, can be introduced, without further accessory, into the heating enclosure in order to assure the vulcanizing of the connecting layer of rubber.

These known processes do not always give satisfactory results. In particular, this second process does not make it possible completely to evacuate gases which are present in the connecting layer of rubber or are produced upon the vulcanization reaction.

An object of the present invention is to provide a process which makes it possible to cause a face of a first body of rubber to adhere very firmly to a face of a second body of rubber without the use of a flexible sheath.

In accordance with the present invention, the process of bonding one face of a first body of rubber to one face of a second body of rubber which consists of (a) applying said face of the first body to said face of the second body with interpositioning of a connecting layer of vulcanizable rubber, (b) evacuating gaseous inclusions imprisoned between the rubber bodies and/or resulting from a subsequent vulcanization reaction, and (c) vulcanizing the resultant assembly, is characterized by the fact that (a) said face of the first body is applied in such a manner that at least the edges of said face of the first body are well complementary in shape with said face of the second body, and (b) the gaseous inclusions are evacuated towards at least one orifice provided in at least one of said faces.

Another object of the present invention is to provide a body of rubber which is particularly well adapted for the application of the bonding process of the invention.

According to the present invention, the body of rubber is such that a face intended to be bonded is provided with means for drainage of gaseous inclusions, the drainage means not debouching at the edges of said face and leading to at least one orifice provided in said face which is intended to be bonded.

The bonding process is applied, in particular but not exclusively, for the manufacture and restoration of pneumatic tires. Although the description which follows relates solely to recapping, it is to be understood that the present invention can be employed whenever there is need for bonding the faces of vulcanized or vulcanizable rubber bodies to each other by means of a connecting layer of vulcanizable rubber.

Figure 1:
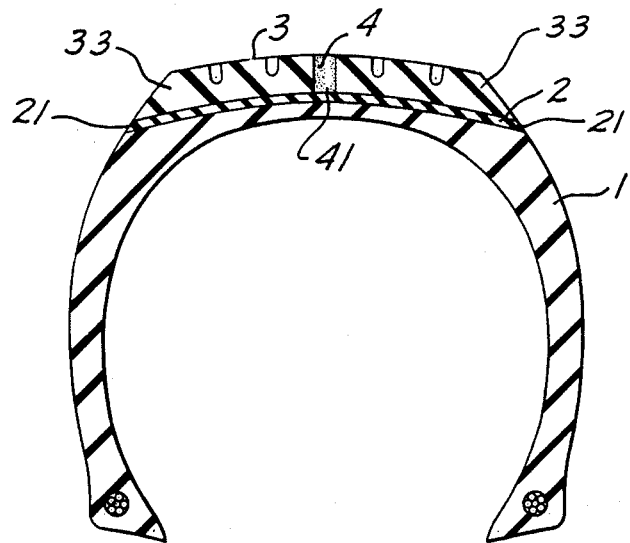
FIG. 1 is a sectional view through a pneumatic tire comprising an assembly to be vulcanized.

FIG. 1 makes it possible to understand better the principle of operation of the bonding process of the present invention. There can be noted therein a tire carcass 1, a connecting layer of vulcanizable rubber 2 and a tire tread 3. The process of bonding employed for the restoration of tire treads "outside the mold" makes it possible to evacuate the gases at the level of the connecting layer of rubber 2 in very effective manner while eliminating the use of an airtight flexible sheath. The gaseous inclusions are evacuated towards at least one orifice 41 provided in the underside 31 of the tread 3. The orifice 41 is the base of a conduit 4 which passes through the tread 3. The evacuation of the gaseous inclusions is effected by aspiration or suction through the conduit 4. In this way the tread 3 plays the role of the airtight flexible sheaths of the prior art.

It has been found unexpectedly that it is not always necessary to improve the closing of the ends 21 of the connecting layer of rubber 2. It is sufficient if, after application of the tread 3 onto the carcass 1 covered with the connecting layer of rubber 2, at least the edges 33 of the tread 3 exhibit good complementarity of shape with the carcass 1. The applicant believes that the surprising improvement in the effectiveness of the evacuation of the gaseous inclusions is due to the decrease in the losses of pressure resulting from the aspiration or suctioning through one or more conduits 4 in the place and stead of aspiration or suctioning through the ends 21 of the connecting layer of rubber 2. This aspiration or suctioning can be effected before the vulcanization; it may be maintained during the vulcanization; or it may be effected solely during the vulcanization in the oven, while considerably simplifying this step as compared with the customary processes. As a matter of fact, it is sufficient to connect a flexible hose to one or more conduits 4 so as to maintain them at a pressure below that prevailing within the enclosure in which the assembly to be vulcanized is contained.

In certain cases, for instance when the complementary nature of the shape of the faces to be assembled is poor, it may be advantageous to close the ends 21 of the connecting layer of rubber 2 by producing an airtight connection either chemically or mechanically. This can be done, for instance, by covering the ends 21 with a suitable material or by local vulcanization. The aspiration or suctioning of the included gases takes place—in accordance with one essential feature of the present invention—after the closing of the ends 21 of the connecting layer of rubber 2.

Figure 2:
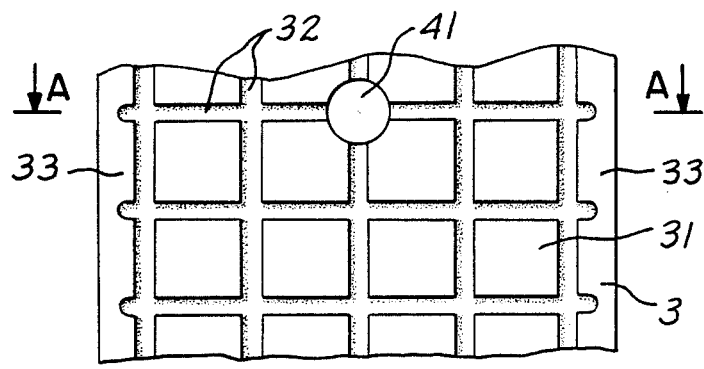
FIG. 2 is a partial view of the underside of a tread.

FIG. 2 shows in part the underside 31 of a tire tread 3 which is particularly well suited for the carrying out of the bonding process of the present invention. There can be noted here a network of channels 32 intended to improve the drainage of the gases. These channels 32 do not debouch at the side edges 33. It is thus needless to improve the tightness at the location of the ends 21 of the connecting layer of rubber 2 (See FIG. 1). The channels 32 collect the air or the gases resulting from the vulcanization over the entire surface of the connecting layer of rubber and drain these gases towards an orifice 41.

In the case of an annular tread, the channels 32 can be interrupted circumferentially, in particular at the place of the weld if the ring is obtained by the end-to-end abutting of a tread which has been prepared flat. There is at least one orifice 41 per zone where the channel or channels 32 form an uninterrupted network. Each orifice 41 is the base of a conduit 4. One can also provide one or more conduits 4 axially, whether the channels 32 are interrupted axially or not. The minimum density (or number of channels per unit of surface) of the network of channels 32 must be determined experimentally. It is, to be sure, in particular a function of the nature of the connecting layer of rubber 2 and of the dimensions of the channels 32. The depth of the channels 32, in the direction of the thickness of the tread 3, is preferably between 0.5 mm and 3 mm.

Figure 3:
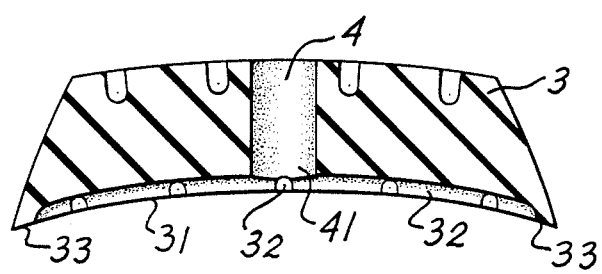
FIG. 3 is a section along the axis A—A of FIG. 2.

FIG. 3 shows a cross section through the same tread 3, passing through a channel 32. It can be seen that the channel 32 does not debouch at the side ends 33 of the tread 3. Channel 32 creates a path for the evacuation of the gases towards the orifice 41 and then towards the conduit 4 which passes through the tread 3. The shape of the conduit 4 may be any desired shape. Conduit 4 may debouch at any point on the underside 31 of the tread 3 and may debouch at any point on the tread 3.

Figure 4:
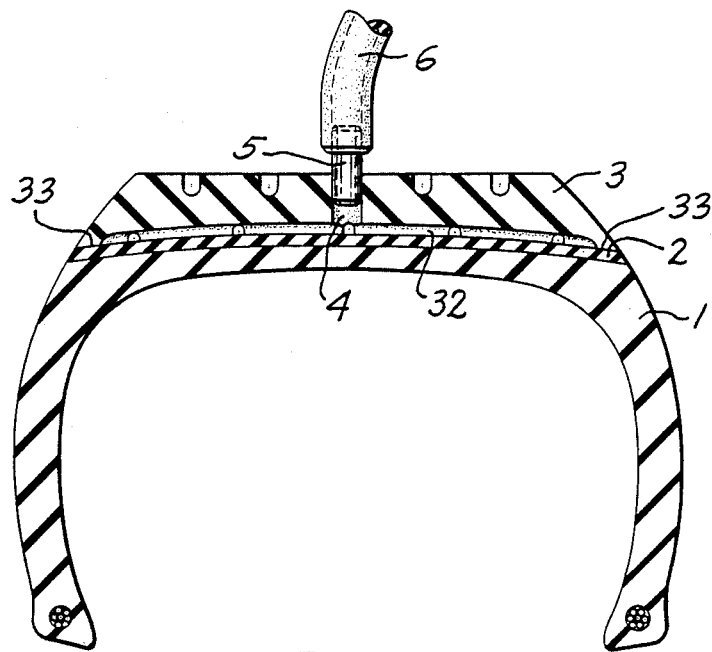
FIG. 4 is a sectional view through an assembly to be vulcanized, provided with a suction device.

FIG. 4 illustrates schematically a preferred manner for carrying out the bonding process of the invention. It shows a premolded tread 3 of the type described above, applied to a carcass 1 by means of a connecting layer of vulcanizable rubber 2. The carcass 1 had been previously suitably prepared in known manner. A cannula 5 is force fitted in a conduit 4 which passes through the tread 3. This cannula 5 is connected via a flexible hose 6 to a source of vacuum or to a region in which there prevails a pressure less than that of the enclosure in which the assembly consisting of the carcass 1, the connecting layer of rubber 2 and the tread 3 is arranged. One thus proceeds with the aspiration or suctioning and evacuation of the gases at the level of the connecting layer of rubber 2. This connection to a region under vacuum is preferably maintained during the heating in the vulcanization enclosure. The evacuation of the air and/or gases coming from the vulcanization reaction is favored by the network of channels 32 provided on the underside 31 of the tread 3. These channels 32 progressively fill up, in whole or in part, with rubber coming from the connecting layer 2 during the viscous phase of passage of the rubber to the plastic state. This rubber also rises into the conduit 4. Several conduits 4 are produced, arranged circumferentially, each draining the gaseous products below a sector-shaped zone of the tread. It has been found by experiment that, in general, it is sufficient to provide a single conduit 4 transversely, even in the case of larger truck tires. However, the bonding process is in no way limitative and several conduits 4 may be present, in particular in the case of larger tires of construction equipment.

One can also use tire treads or parts of tire tread which do not have a network of channels impressed on their underside. In that case, the underside is prepared, in known manner, by carding or brushing so as to obtain a "roughness" on a surface which does not extend up to the side edges 33, in accordance with one essential feature of the invention. By "roughness", there is understood a surface condition, the amplitude of the crest-to-crest variation of which is far greater than the "final value" of the amplitude of the crest-to-crest variation measured on the surface of the side edges 33. By "final value" there is understood the value measured after possible preparation of the surface of the side edges 33 by brushing, in customary manner, the sole purpose of which is to favor the adherence without creating a passageway for the air.

Figure 5:
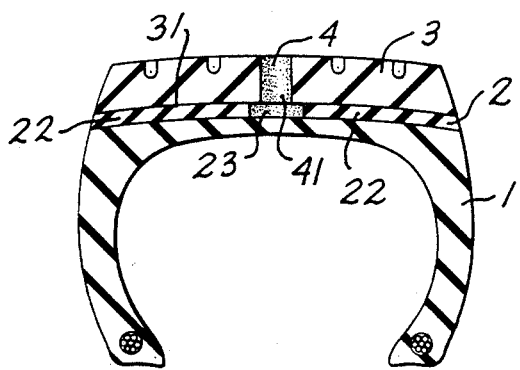
FIGS. 5, 6 and 7 show variant embodiments of assemblies to be vulcanized.
Figure 6:
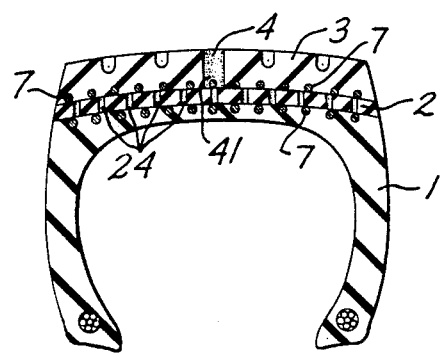
Figure 7:
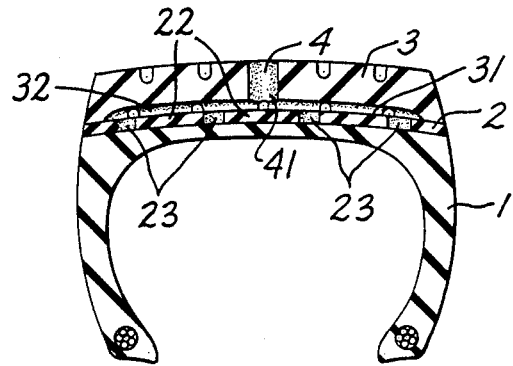

FIGS. 5 to 7 illustrate different variations in the bonding process described above. The drainage of the air within the connecting layer of rubber 2 is assured therein in different ways.

In FIG. 5, the connecting layer of rubber 2 is arranged in two side layers 22 leaving a free circumferential central space 23 just below the circumferentially arranged orifices 41. The underside 31 of the tread 3 does not have any channels 32, but rather has roughness. The aspiration or suctioning of the gases takes place at the level of the two faces of the connecting layers 22.

In FIG. 6, the drainage is effected by two nettings of textile threads 7 arranged on either side of the connecting layer of rubber 2 and the tread 3, in cooperation with small holes 24 in the connecting layer of rubber 2. The gaseous products find there a path which leads towards the conduits 4. In the case in question, there are transverse nettings (not shown in the figure) which connect the circumferential nettings to each other. These transverse nettings do not debouch at the side edges of the tread in accordance with one essential feature of the bonding process in accordance with the present invention.

In FIG. 7, the connecting layer of rubber 2 is arranged in separate circumferential layers 22, leaving free spaces 23 which communicate with transverse channels 32 provided below the underside 31 of the tread 3 at the level of each orifice 41. A network of paths not debouching on the side edges is again present, it drawing the air towards the orifices 41 and then towards the conduits 4.

The means described show how it is possible to effect the drainage and evacuation of the gaseous inclusions within the connecting layer of rubber 2. To be sure, one can employ any equivalent drainage means or a combination of means which favor the drainage. These drainage means may also be arranged on the carcass 1; they do not debouch on the side edges or ends of the connecting layer of rubber 2; they lead to one or more orifices 41 provided on the underside 31 of the tread 3.

Figure 8:
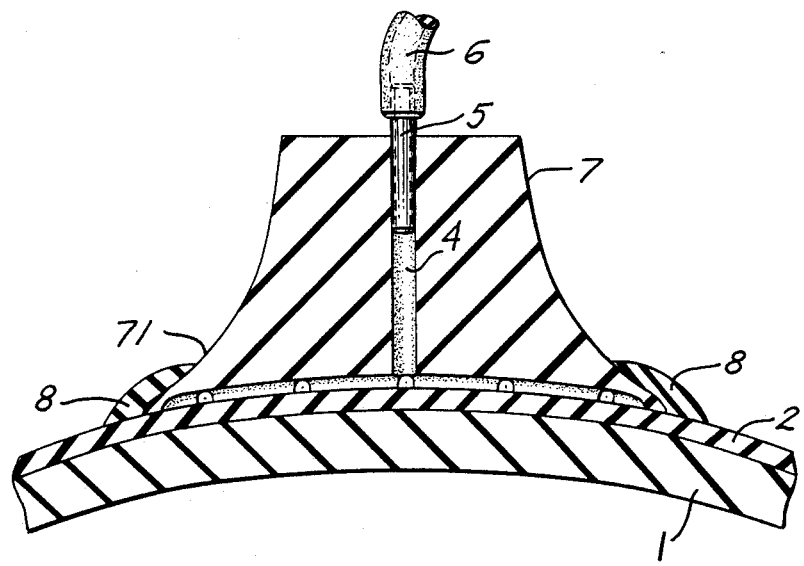
FIG. 8 is a sectional view through a rib or cleat applied to a carcass and provided with a suction device.

FIG. 8 shows the application by bonding of a rib or cleat 7 of the type used for agricultural tractor tires. The rib or cleat 7, in which a conduit 4 has been pierced, is applied to the carcass 1 having thereon the connecting layer of vulcanizable rubber 2. The side flanges 71 of the rib or cleat 7 are applied firmly by a roller wheel. In view of the great length of the free ends of the connecting layer of rubber 2, it may be advantageous to improve their tightness by application of a suitable material 8, as described, for instance, in U.S. Pat. No. 4,424,088, or in French patent No. 2,529,633. A cannula 5 is force-fitted in the conduit 4 and a flexible hose 6 is connected to it so as to connect the bonding zone to an enclosure which is at a pressure less than the pressure of the enclosure in which the assembly to be bonded is located. The rest of the operation is similar to what has been described above.

Figure 9:
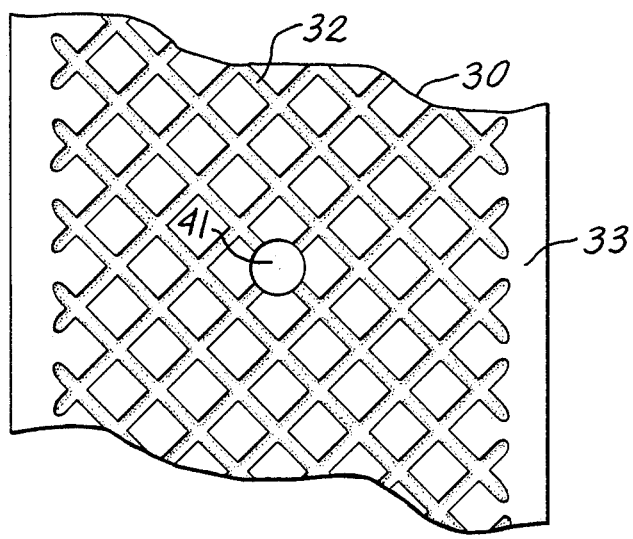
FIGS. 9 and 10 show the undersides of sectors of a tread.

FIG. 9 shows a variant embodiment of the underside of a sector 30 of tread suitable for use in the bonding process of the present invention. The network of channels 32 is made by a stamp which imprints a cross-ruling which does not debouch on the side edges 33 and leads to at least one orifice 41. The orientation of the channels 32 may be any desired orientation and may vary. The density of the network and the dimensions of the channels 32 may be any whatsoever. A minimum value for this density must be determined experimentally and is a function, in particular, of the dimensions of the channels and the nature of the rubber of the connecting layer. This network may be made by any suitable means. For instance, it can be imprinted directly on the mold or be imprinted at the time of the molding by means of a removable insert. It can also be imprinted at the time of molding by an insert which is removed only at the time of the use of the sector for the bonding process.

Figure 11:
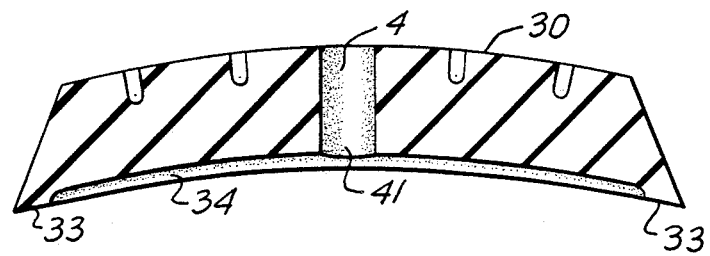
FIG. 11 is a section along the axis B—B of FIG. 10.
Figure 10:
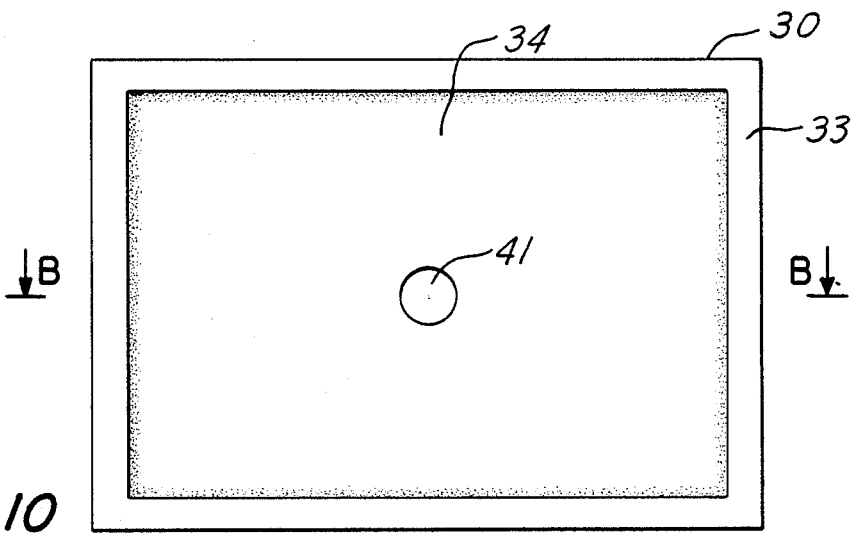

FIGS. 10 and 11 show another variant embodiment of the underside of the tread which is very advantageous for a rib or cleat or a tread sector 30. The network of channels is replaced by a zone 34 which is recessed with respect to the side edges 33 of the underside of the sector 30. The side edges 33 applied to the connecting layer of rubber assure sufficient tightness. The space left by the zone 34 permits the aspirating or suctioning of the gaseous inclusions towards an orifice 41. The sector is applied by suction in the manner of a suction cup. This manner of producing the underside can also be used for a tread, preferably only if the latter is not very wide.

Another advantageous manner of producing a drainage zone for the gaseous inclusions is to effect a brushing or carding of the zone 34. Initially, this zone is at the same level as the edges 33. By the brushing or carding a roughness is produced. The expression "roughness" has been defined above. Preferably the amplitude of the crest-to-crest variation of this roughness is between 0.1 mm and 2 mm. One can also obtain a suitable roughness by molding the sector, in known manner, with a cloth covering the zone 34 and then removing the cloth after molding The texture of the cloth impresses a suitable roughness in the zone 34, creating a network of paths capable of conducting the gaseous inclusions towards an orifice 41.

A first example of the carrying out of the bonding process of the present invention has just been described. In this first example, the suctioning of the gaseous inclusions is effected due to a source of vacuum or a zone in which there prevails a pressure which is less than that in the enclosure in which the assembly to be vulcanized is arranged. The applicant has found that, in certain cases, this zone of lesser pressure can advantageously be provided in the tread itself in the form of at least one dead-end hole, that is to say a hole which does not debouch at the surface of the tread, made in the underside of the tread in a rather thick region so as to withstand without collapsing the pressure which prevails in the vulcanization enclosure, the dead-end hole forming an extension of the orifice towards which the gaseous inclusions are evacuated.

Figure 12:
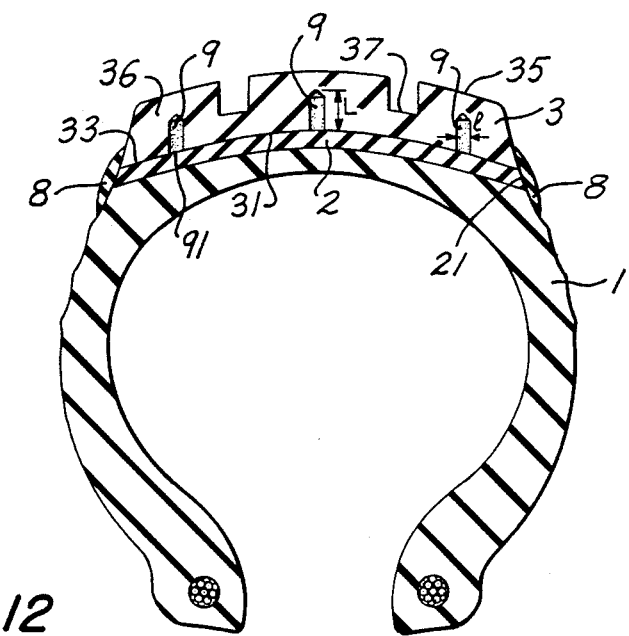
FIG. 12 is a sectional view through an assembly to be vulcanized, illustrating one variant of the process of bonding in accordance with the invention.

FIG. 12 makes it possible to understand this second embodiment of the bonding process of the present invention. It shows an assembly which is to be vulcanized, consisting of a carcass 1 which has been suitably prepared, a connecting layer of rubber 2 and a tread 3.

The tread 3 used here has dead-end holes 9 which are provided on the underside 31 of the tread 3 and therefore do not debouch on the surface 35 of the tread 3. This tread 3 is applied to the carcass 1 provided with the connecting layer of rubber 2 within an environment in which a pressure $p_1$ prevails, for instance, atmospheric pressure. After the applying of the tread 3, the desired tightness of the connecting layer 2 can be improved by a suitable material 8 (as in FIG. 8). The assembly is then introduced into a vulcanization enclosure. The pressure $p_2$ prevailing in the enclosure during the vulcanization is usually on the order of 5 bars. However, the dead-end holes 9 are still at the atmospheric pressure $p_1$. From this there results a difference in pressure $p_2-p_1$ between the side edges 33 of the tread 3 and the orifice 91 of the dead-end holes 9 debouching on the underside 31 of the tread 3.

This difference in pressure creates a suction effect which is capable of draining the gases towards the orifices 91. This method of bonding is particularly suitable in the case of very deeply sculpted treads, consisting of rubber blocks 36 surrounded by deep grooves 37. As a result of the slight thickness of rubber between the underside 31 and the bottom of the groove 37, the bottom of the groove 37 collapses under the effect of the pressure $p_2$ and one thus again has a difference in pressure $p_2-p_1$ which makes it possible to direct properly the evacuation of the gases towards the dead-end holes 9. To be sure, it is necessary to provide at least one dead-end hole 9 per block 36 surrounded by grooves 37. The number and volume of the dead-end holes 9 depend, in particular, on the area of the surface over which the gases must be drained, the thickness of the connecting layer of rubber as well as the different means employed for improving the drainage of the gases (primarily carding in order to obtain a given bonding grain but also any other means known to the man skilled in the art). It has been found that it is desirable to have a cumulative volume of dead-end holes of $5.10^{-6}$ m$^3$ to $5.10^{-4}$ m$^3$ per m$^2$ of surface to be drained. On the other hand, it is desirable for the ratio of the depth L of dead-end holes 9 to the width L' of the dead-end holes 9 to be greater than 3 ($L/L'>3$). It has been found that, due to this bonding process, one obtains excellent adherence between the bonded bodies. When means for improving the drainage of the gases are used, they are advantageously employed in the manner explained above; the drainage means do not debouch towards the ends 21 of the connecting layer of rubber 2; they direct the drainage towards the dead-end holes 9.

The zones in which bubbles of gas are still present at the level of the interface between the bonded bodies 1 and 3 are concentrated below the dead-end holes 9 instead of being distributed over the entire contact surface. At times, the connecting layer of rubber 2 even rises into the dead-end holes 9. All of this clearly illustrates the suction effect obtained, which directs the gases towards the reservoirs which are at lower pressure than the pressure in the enclosure in which the stack to be vulcanized is located.

The present invention consists of a process of bonding which essentially provides a new way of organizing the drainage of gaseous inclusions. It extends also to the rubber bodies suitable for the use in the process, the face of which intended to be bonded has a central air drainage zone, side edges assuring the tightness, as well as an orifice debouching into the drainage zone.

The invention extends furthermore to the products obtained by such a process, particularly to the tires thus obtained.

What is claimed is:

1. A process of bonding one face of a first body of rubber to one face of a second body of rubber without the use of an airtight flexible sheath which consists of
 applying said face of the first body to said face of the second body with interpositioning of a connecting layer of vulcanizable rubber,
 evacuating gaseous inclusions imprisoned between the rubber bodies and/or resulting from a subsequent vulcanization reaction, and
 vulcanizing the resultant assembly, characterized by the fact that
 said face of the first body is applied in such a manner that at least the edges of said face of the first body are complementary in shape with said face of the second body, and
 the gaseous inclusions are evacuated by suction towards at least one orifice provided in at least one of said faces, each orifice being the base of a conduit which passes through at least one of the rubber bodies and to which a flexible suction hose is attached.

2. A process of bonding one face of a first body of rubber to one face of a second body of rubber without the use of an airtight flexible sheath which consists of
 applying said face of the first body to said face of the second body with interpositioning of a connecting layer of vulcanizable rubber,
 evacuating gaseous inclusions imprisoned between the rubber bodies and/or resulting from a subsequent vulcanization reaction, and
 vulcanizing the resultant assembly, characterized by the fact that
 said face of the first body is applied in such a manner that at least the edges of said face of the first body are complementary in shape with said face of the second body, this application being achieved in an environment in which a pressure $p_1$ prevails, and
 the gaseous inclusions are evacuated towards at least one orifice provided in at least one of said faces, each orifice being the base of a dead-end hole, and the evacuation of the gaseous inclusions being effected in an enclosure in which there prevails a pressure $p_2$ greater than the pressure $p_1$.

3. A process according to claim 1 or 2, characterized by the fact that after application of said face of the first body to said face of the second body a tight connection is produced chemically or mechanically at the free ends of the connecting layer of vulcanizable rubber.

4. A process according to claim 1 or 2, characterized by the fact that the second body is a tire carcass and the first body is a tire thread.

5. A process according to claim 1 or 2, characterized by the fact that the second body is a tire carcass and the first body is a part of a tire thread.

6. A product obtained by the application of a process according to claim 2.

7. A product according to claim 6, characterized by the fact that it is a tire.

8. A body of rubber, one of the faces of which is intended to be bonded onto one face of another body of rubber, characterized by the fact that said face intended to be bonded comprises means for the drainage of gaseous inclusions, the drainage means not debouching at the edges of said face intended to be bonded and leading to at least one orifice provided in said face intended to be bonded, each orifice being the base of a dead-end hole.

9. A body of rubber according to claim 8, characterized by the fact that the drainage means consist of at least one network of channels comprising at least one orifice per network.

10. A body of rubber according to claim 8, characterized by the fact that the drainage means are formed of at least one zone recessed with respect to the edges of said face intended to be bonded and comprising at least one orifice per zone.

11. A body of rubber according to claim 8, characterized by the fact that the drainage means are formed by at least one zone, the surface of which has a roughness and comprising at least one orifice per zone.

12. A body of rubber according to claim 11, characterized by the fact that the amplitude of the crest-to-crest variation of the roughness is between 0.1 mm and 2 mm.

13. A body of rubber according to claim 8, characterized by the fact that the cumulative volume of the dead-end holes is between $5.10^{-6}\,m^3$ and $5.10^{-4}\,m^3$ per $m^2$ of surface to be drained.

14. A body of rubber according to claim 8 or 13, characterized by the fact that the ratio of the depth of the dead-end holes to the width of the dead-end holes is greater than 3.

15. A body of rubber according to claim 8, characterized by the fact that it is a tire tread.

16. A body of rubber according to claim 8, characterized by the fact that it is a part of a tire tread.

* * * * *

UNITED STATES PATENT AND TRADEMARK OFFICE
CERTIFICATE OF CORRECTION

PATENT NO. : 4,934,426

DATED : June 19, 1990

INVENTOR(S) : Remond et al.

It is certified that error appears in the above-identified patent and that said Letters Patent is hereby corrected as shown below:

Col. 7, line 50, "width L" should read --width $\ell$--;

line 51, "L/L" should read --L/$\ell$--.

Signed and Sealed this

Tenth Day of September, 1991

Attest:

HARRY F. MANBECK, JR.

Attesting Officer

Commissioner of Patents and Trademarks